United States Patent
Saha et al.

(10) Patent No.: US 9,261,022 B2
(45) Date of Patent: Feb. 16, 2016

(54) SYSTEM FOR CONTROLLING A COOLING FLOW FROM A COMPRESSOR SECTION OF A GAS TURBINE

(71) Applicant: General Electric Company, Schenectady, NY (US)

(72) Inventors: Rajarshi Saha, Bangalore (IN); Santhosh Donkada, Bangalore (IN); Indrajit Mazumder, Bangalore (IN); Bhaskar Pemmi, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 538 days.

(21) Appl. No.: 13/708,092

(22) Filed: Dec. 7, 2012

(65) Prior Publication Data

US 2014/0157791 A1  Jun. 12, 2014

(51) Int. Cl.
| | |
|---|---|
| F02C 9/18 | (2006.01) |
| F02C 7/12 | (2006.01) |
| F01D 17/14 | (2006.01) |
| F01D 25/12 | (2006.01) |
| G05D 23/02 | (2006.01) |

(52) U.S. Cl.
CPC ............... F02C 7/12 (2013.01); F01D 17/141 (2013.01); F01D 17/145 (2013.01); F01D 25/12 (2013.01); F02C 9/18 (2013.01); F05D 2260/20 (2013.01); F05D 2270/3062 (2013.01); F05D 2300/505 (2013.01); G05D 23/024 (2013.01); G05D 23/025 (2013.01)

(58) Field of Classification Search
CPC ............... F02C 9/18; F02C 3/13; F02C 6/08; F04D 15/0011; G05D 23/024
See application file for complete search history.

(56) References Cited

U.S. PATENT DOCUMENTS

| | | | |
|---|---|---|---|
| 4,157,010 A * | 6/1979 | Sailer | 60/774 |
| 6,485,255 B1 | 11/2002 | Care et al. | |
| 6,615,574 B1 * | 9/2003 | Marks | 60/772 |
| 7,241,107 B2 * | 7/2007 | Spanks et al. | 415/115 |
| 8,057,157 B2 * | 11/2011 | Roush | F02C 6/08 415/1 |
| 8,678,753 B2 * | 3/2014 | Farrell | 415/126 |
| 2005/0155343 A1 | 7/2005 | Gowda et al. | |
| 2009/0226327 A1 | 9/2009 | Little et al. | |
| 2010/0239413 A1 | 9/2010 | Tesh et al. | |
| 2010/0276025 A1 | 11/2010 | Sellers et al. | |
| 2010/0282191 A1 * | 11/2010 | Sand | F01P 7/16 123/41.09 |
| 2010/0294476 A1 * | 11/2010 | Gorni | F16K 31/002 165/276 |
| 2013/0336757 A1 * | 12/2013 | Subbareddyar | F02C 7/18 415/1 |

FOREIGN PATENT DOCUMENTS

EP  2116621 A2  11/2009

* cited by examiner

*Primary Examiner* — Phutthiwat Wongwian
*Assistant Examiner* — Rene Ford
(74) *Attorney, Agent, or Firm* — Dority & Manning, PA

(57) ABSTRACT

A system for controlling a flow rate of a compressed cooling medium between a compressor section and a turbine section of a gas turbine includes a flow path that is defined between the compressor section and the turbine section of the gas turbine and a thermally actuated variable flow valve disposed within the flow path. The variable flow valve defines an opening that changes in size based on a temperature of the compressed cooling medium flowing therethrough.

19 Claims, 8 Drawing Sheets

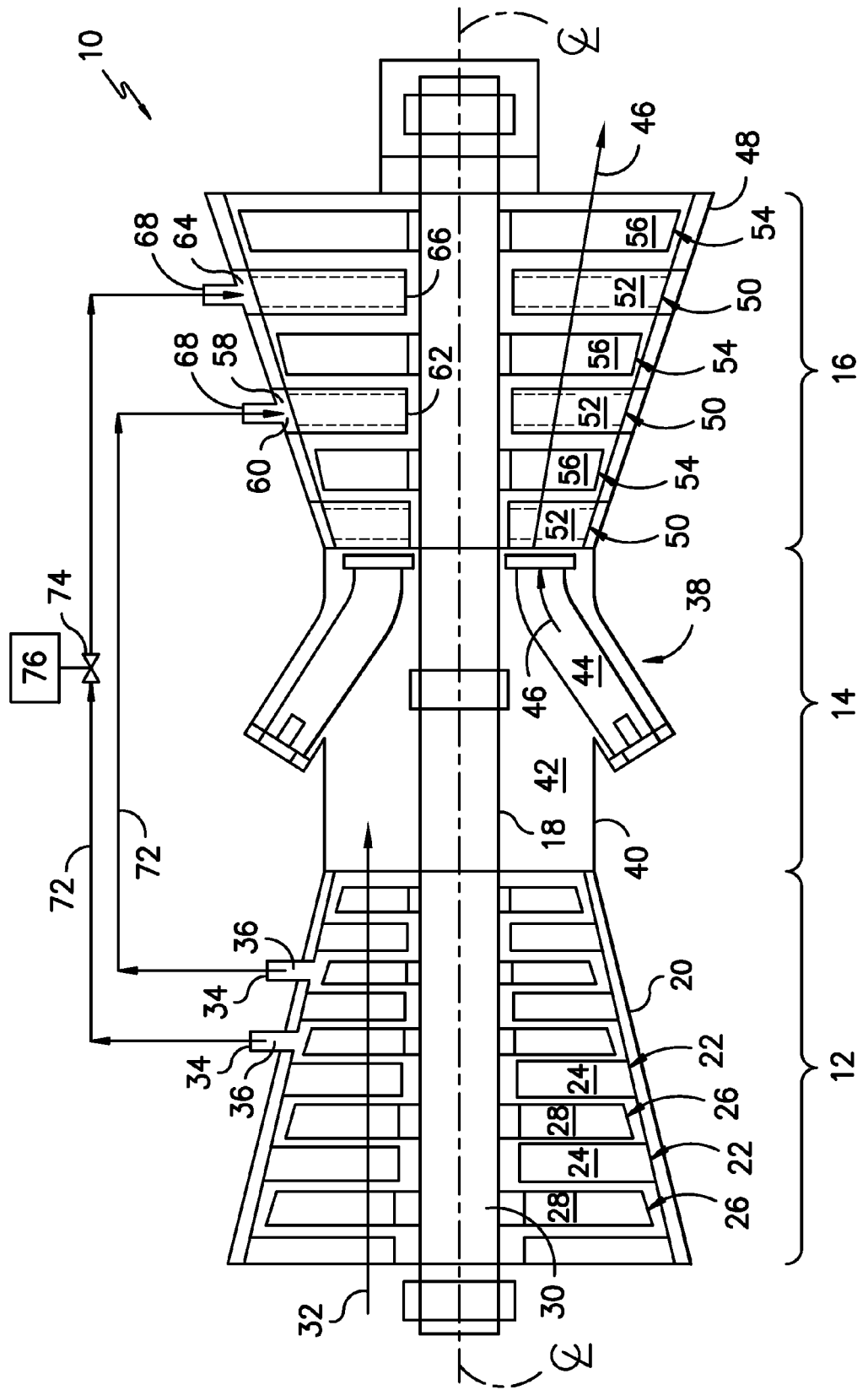
FIG. -1-

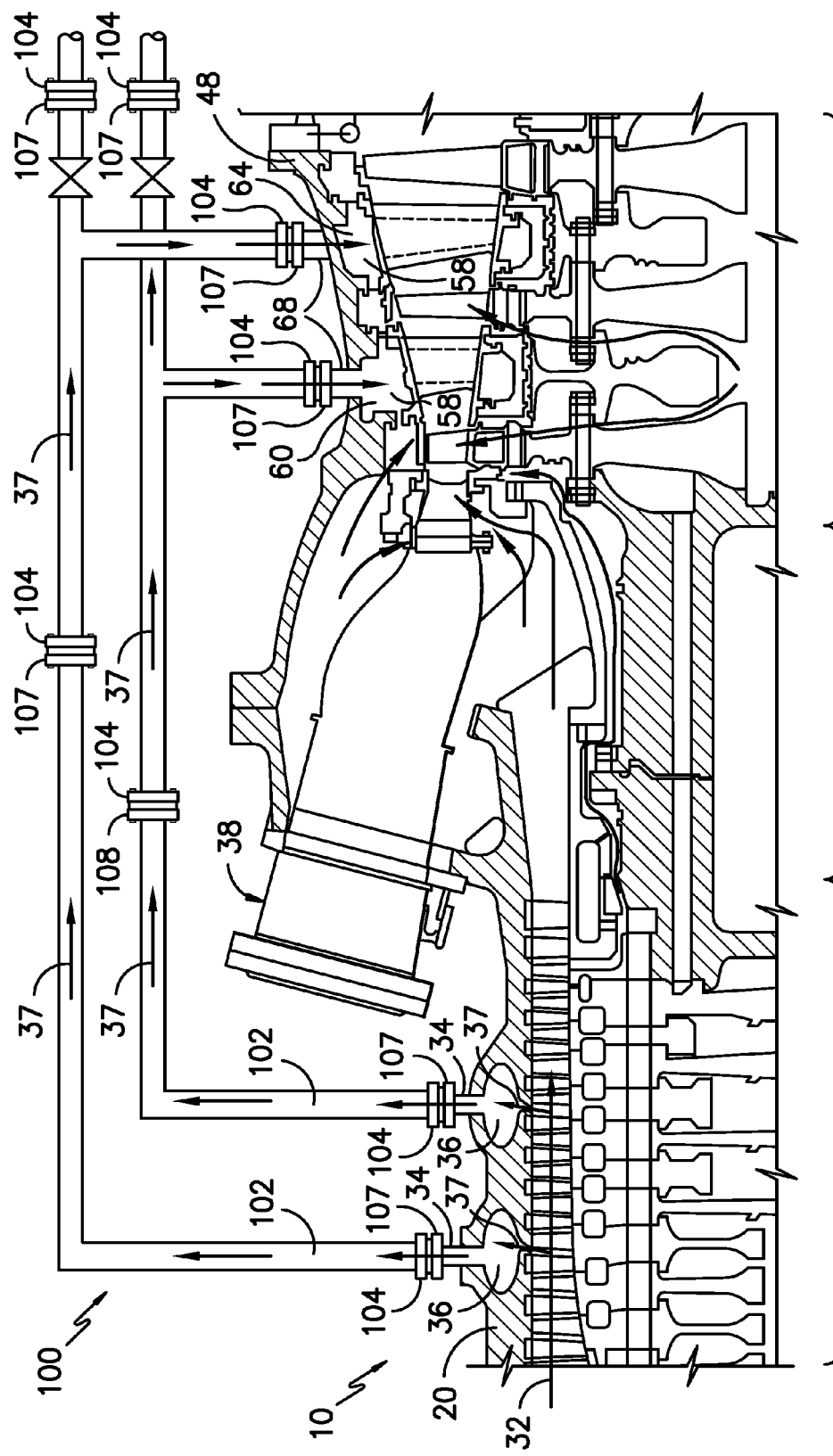
FIG. -2-

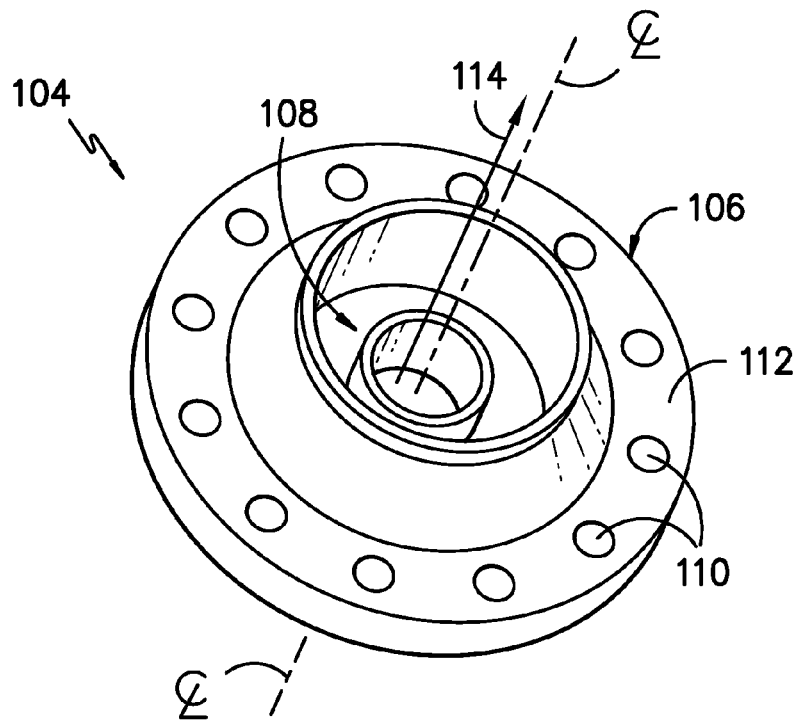
FIG. -3-
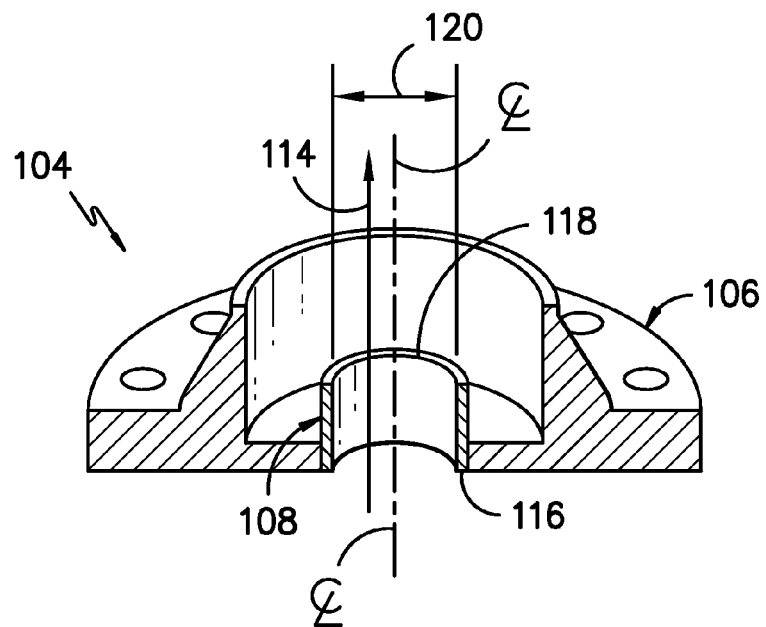
FIG. -4-

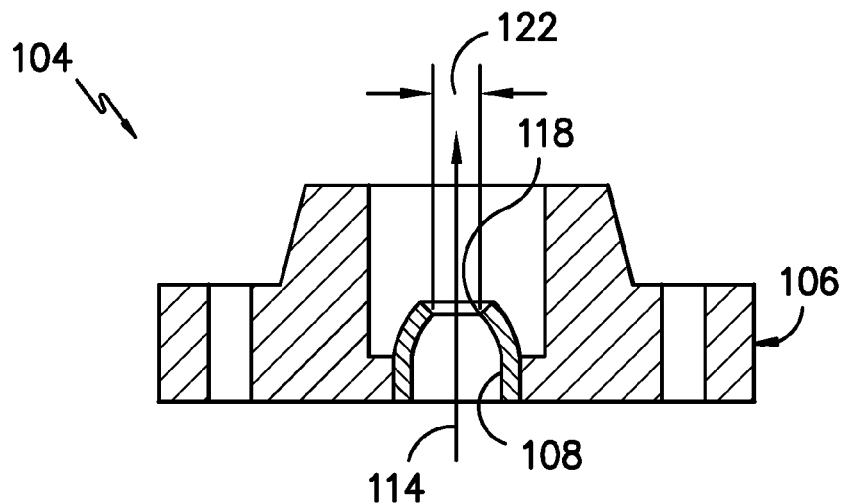
FIG. -5-
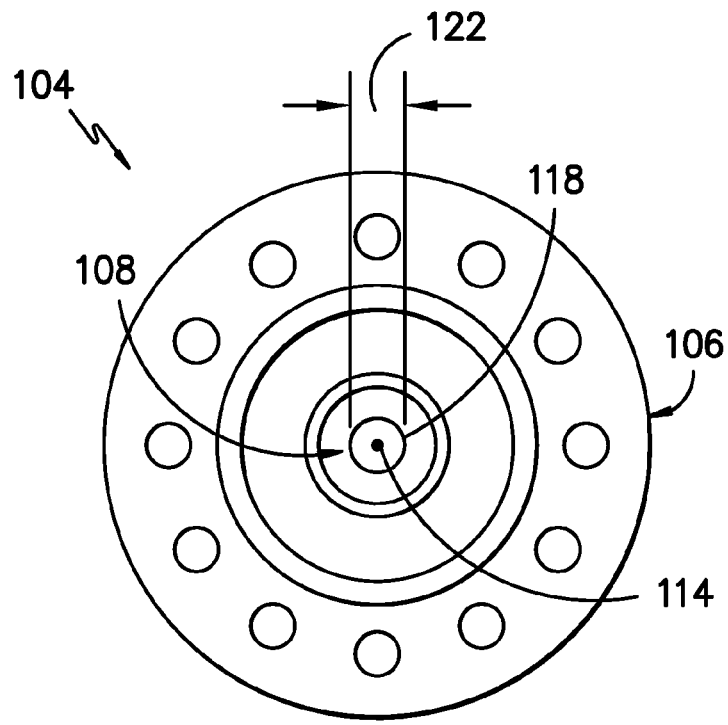
FIG. -6-

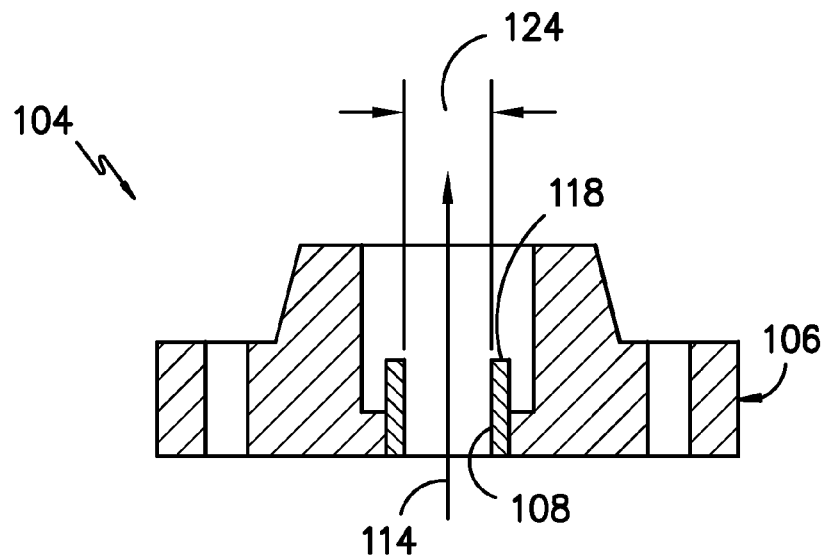
FIG. -7-
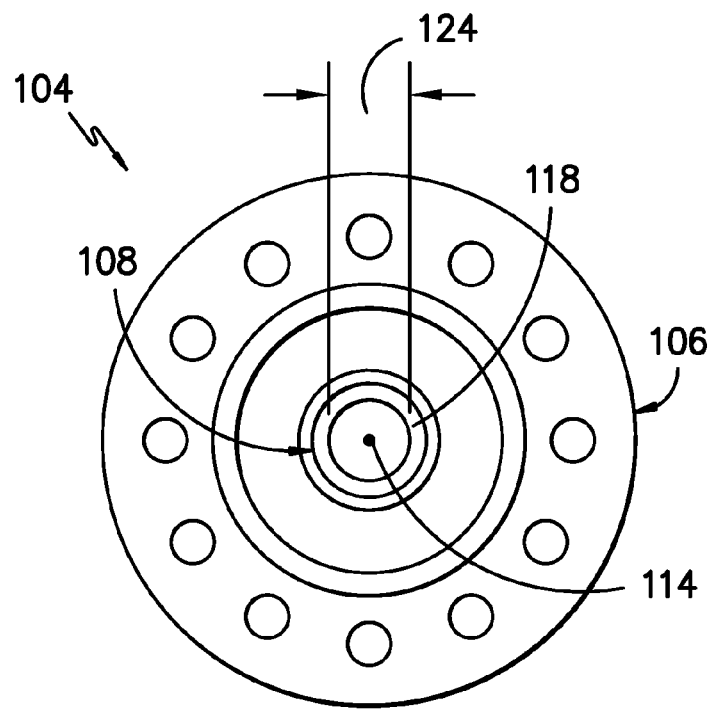
FIG. -8-

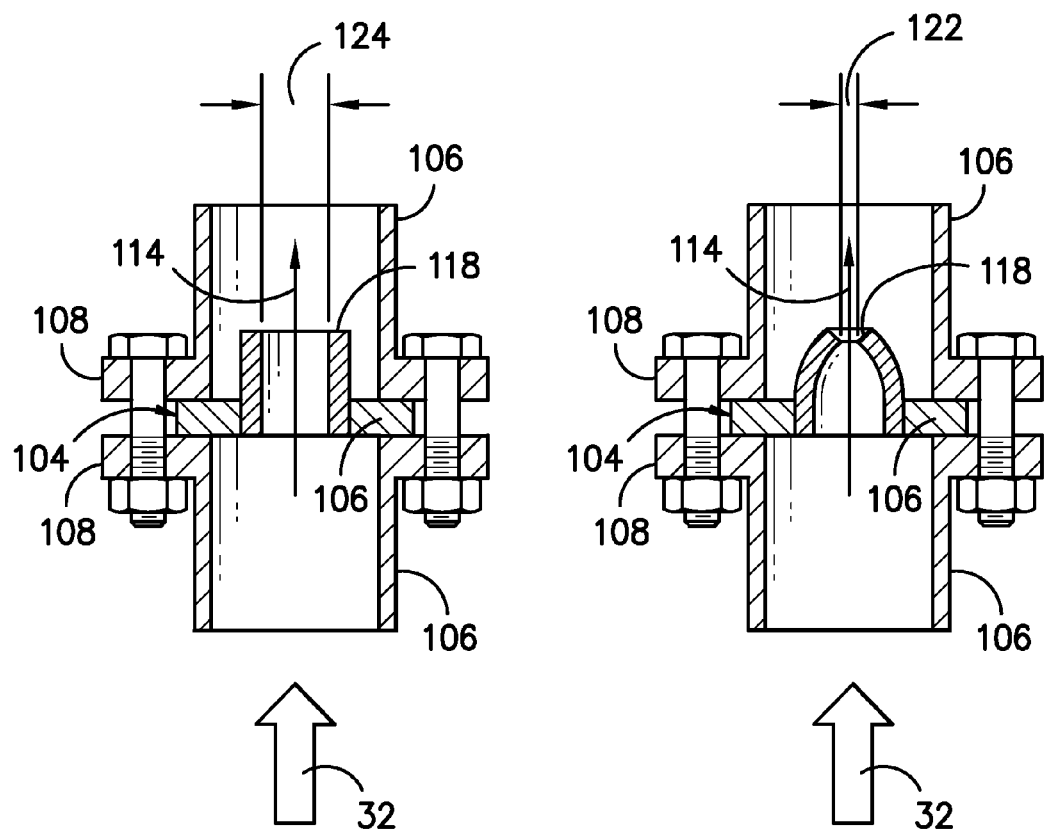
FIG. -9-   FIG. -10-

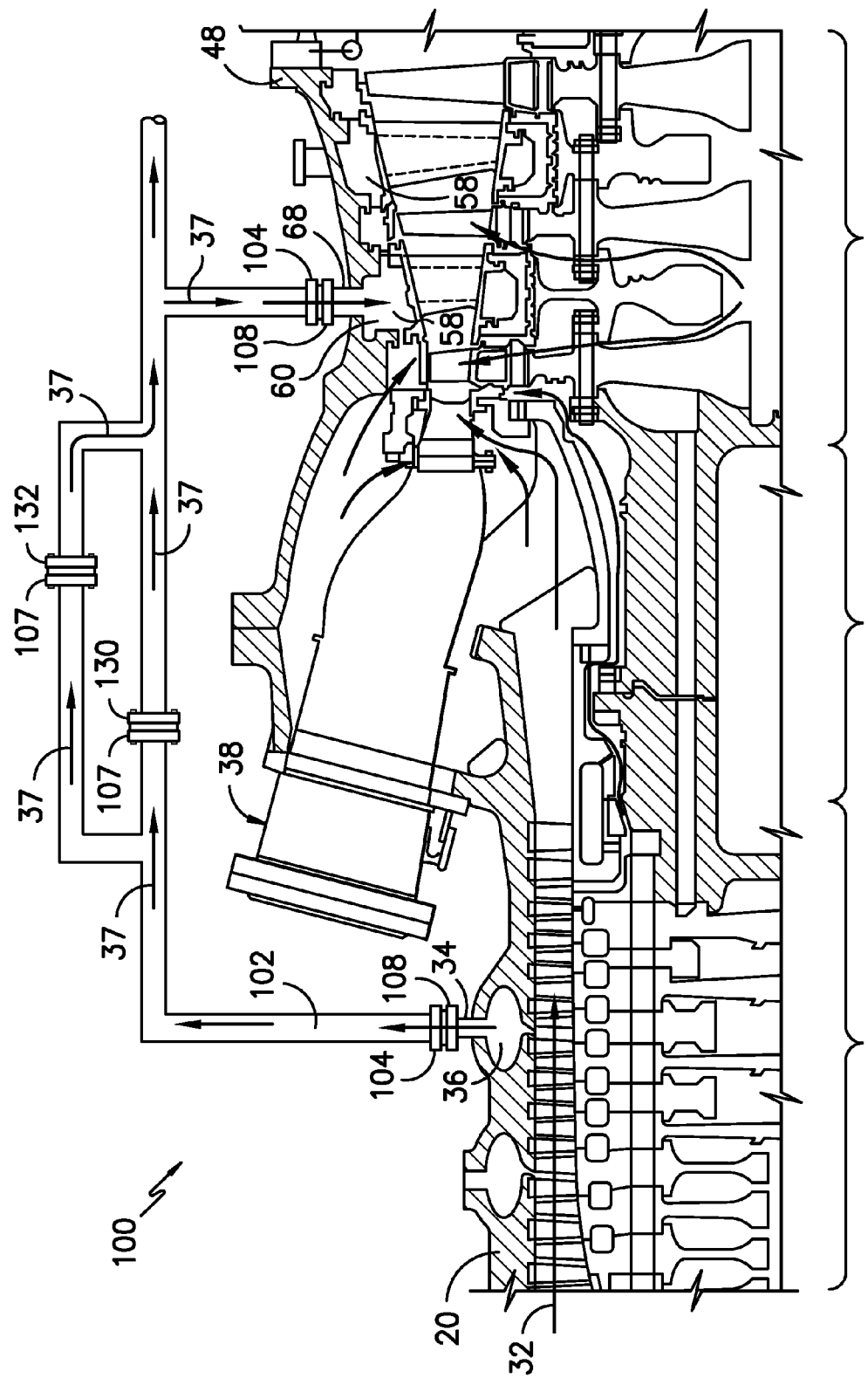
FIG. -11-

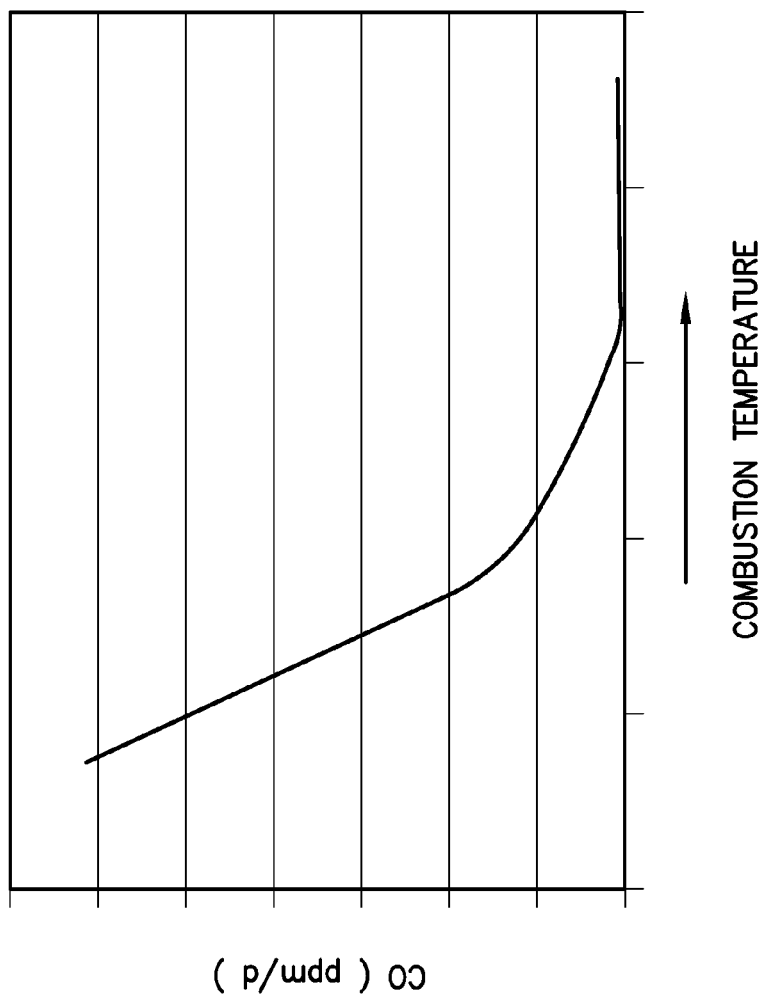
FIG. -12-

SYSTEM FOR CONTROLLING A COOLING FLOW FROM A COMPRESSOR SECTION OF A GAS TURBINE

FIELD OF THE INVENTION

The present invention generally relates to a gas turbine. More particularly, this invention includes a system for controlling a cooling flow of a compressed cooling medium from a compressor section to a turbine section of a gas turbine.

BACKGROUND OF THE INVENTION

A gas turbine generally includes an axial compressor, a combustion section downstream from the compressor and a turbine section downstream from the combustion section. The compressor generally includes a casing and an inlet that is disposed at an upstream end of the casing. The combustion section generally includes a plurality of combustors arranged in an annular array around an axially extending shaft that extends at least partially through the gas turbine. The turbine section generally includes an outer casing that at least partially circumferentially surrounds the shaft. The turbine section further includes multiple rows or stages of stationary vanes that extend radially inward from an inner surface of the outer casing so as to circumferentially surround the shaft. Each row of the stationary vanes is axially separated by a row of turbine blades that extend radially outward from the shaft.

In operation, a working fluid such as air is ingested through the inlet of the compressor and is progressively compressed as it flows through the compressor towards the combustion section. A primary portion of the compressed air is routed to each combustor of the combustion section for cooling various hot gas path components and/or for mixture with a fuel for combustion.

A secondary portion of the compressed air is extracted from the compressor upstream from the combustion section through one or more extraction ports that extend through the compressor casing. The secondary portion of the compressed air is routed from the compressor through one or more fluid conduits and/or couplings and into various cooling circuits defined within the turbine section of the gas turbine. The secondary portion of the compressed air is used as a cooling medium to cool various components of the turbine section such as one or more of the rows of the stationary vanes.

Generally, one or more flow control valves such as modulating valves are disposed between the extraction ports and the turbine section to control the flow rate of the secondary portion of the compressed air that flows from the compressor into the turbine section. During base-load or peak-load operation of the gas turbine, when the cooling requirements for the turbine section are the highest, the flow control valves are set to allow a higher flow rate of the compressed air than when the gas turbine is being operated at a part-load or in an unloaded condition. During part-load operation, when the cooling requirements of the turbine section are reduced, the flow control valves restrict or limit the flow of the compressed into the turbine section to improve compressor and/or overall gas turbine efficiency. One concern with this type of system for controlling the flow rate of the compressed air to the turbine section is that the flow control valves require measurement and feedback control, thereby potentially compromising the overall reliability of the gas turbine.

In alternate gas turbine configurations, the flow control valves do not modulate or actuate to reduce the flow rate. As a result, excess compressed air is routed into the turbine section during part-load operation, thereby reducing the overall efficiency of the compressor and/or the gas turbine. Accordingly, an improved system for reducing the flow rate of the compressed air flowing from the compressor to the turbine section during part-load operation of the gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a system for controlling a flow rate of a compressed cooling medium between a compressor section and a turbine section of a gas turbine. The system generally comprises a flow path defined between the compressor section and the turbine section of the gas turbine and a thermally actuated variable flow valve disposed within the flow path. The variable flow valve defines an opening that changes in size based on a temperature of the compressed cooling medium flowing therethrough.

Another embodiment of the present invention is a system for controlling a flow rate of a compressed cooling medium between a compressor section and a turbine section of a gas turbine. The system includes an extraction port of the compressor section, an inlet port of the turbine section and a flow path defined between said extraction port and said inlet port. A thermally actuated variable flow valve is disposed within the flow path between the extraction port and the inlet port. The variable flow valve defines an opening that changes in size based on a temperature of the cooling medium flowing therethrough.

Another embodiment of the present invention includes a gas turbine having a compressor section having a casing and an extraction port that extends through the casing. The extraction port defines a flow path for routing a compressed cooling medium through the casing. A combustion section is disposed downstream from the compressor section. A turbine section is disposed downstream from the combustion section. The turbine section includes a turbine casing and an inlet port. The turbine casing at least partially defines a cooling circuit within the turbine section. The inlet port defines a flow path through the turbine casing and into the cooling circuit. A flow path is defined between the extraction port of the compressor section and the inlet port of the turbine casing. A thermally actuated variable flow valve is disposed within the flow path. The variable flow valve defining an opening that modulates between an open position and an at least partially closed position based on a temperature of the compressed cooling medium flowing therethrough.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 illustrates a cross section side view of an exemplary gas turbine;

FIG. 2 illustrates a cross section side view of a portion of an exemplary gas turbine including a system for controlling a flow rate of a compressed cooling medium according to at least one embodiment of the present disclosure;

FIG. 3 illustrates a perspective view of a thermally actuated variable flow valve according to at least one embodiment of the present disclosure;

FIG. 4 illustrates a cross section perspective view of the thermally actuated variable flow valve as shown in FIG. 3;

FIG. 5 illustrates a cross section side view of the thermally actuated variable flow valve as shown in FIG. 3 according to at least one embodiment of the present disclosure;

FIG. 6 illustrates a top view of the thermally actuated variable flow valve as shown in FIG. 5;

FIG. 7 illustrates a cross section side view of the thermally actuated variable flow valve as shown in FIG. 3 according to at least one embodiment of the present disclosure;

FIG. 8 illustrates a top view of the thermally actuated variable flow valve as shown in FIG. 7;

FIG. 9 illustrates a cross section side view of the thermally actuated variable flow valve as shown in FIG. 2 according to at least one embodiment of the present disclosure;

FIG. 10 illustrates a cross section side view of the thermally actuated variable flow valve as shown in FIG. 9;

FIG. 11 illustrates a cross section side view of a portion of the exemplary gas turbine as shown in FIG. 2, according to at least one embodiment of the present disclosure; and FIG. 12 illustrates a graphical representation of the effects of combustion temperature on carbon monoxide production.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a thermally actuated variable flow valve incorporated into a gas turbine, one of ordinary skill in the art will readily appreciate from the teachings herein that embodiments of the present invention are not limited to a gas turbine unless specifically recited in the claims.

Referring now to the drawings, FIG. 1 illustrates an example of an exemplary gas turbine 10, and FIG. 2 illustrates a cross section side view of a portion of the gas turbine 10 as shown in FIG. 1, according to at least embodiment of the present disclosure. As shown in FIG. 1, the gas turbine 10 generally includes a compressor section 12, a combustion section 14 downstream from the compressor section 12 and a turbine section 16 downstream from the combustion section 14. One or more shafts 18 extend at least partially axially through the gas turbine 10.

The compressor section 12 generally includes an annular casing 20 that extends circumferentially around at least a portion of the shaft 18. The compressor section 12 further includes a plurality of rows or stages 22 of stationary vanes 24 that extend radially inward from the casing 20. A row or stage 26 of rotatable compressor blades 28 is disposed between successive stages 22 of the stationary vanes 24. The compressor blades 28 extend radially outward from the shaft 18. The compressor blades 28 may be coupled directly to the shaft 18 or to a rotor disk 30 that circumferentially surrounds the shaft 18. In operation, the stages 26 of rotatable compressor blades 28 rotate, thereby drawing a working fluid 32 such as air through the compressor section 12. The working fluid 32 is progressively compressed as it flows towards the combustion section 14.

An extraction port 34 extends through the casing 20 of the compressor section 12. The extraction port 34 at least partially defines a flow path 36 for routing a secondary portion 37 of the compressed working fluid 32 to be used as a cooling medium out of the compressor section 12 from a point upstream from the combustion section 14. As shown in FIG. 1, the gas turbine 10 may include more than one extraction port 34 positioned at different stages of the compressor section 12. The temperature and the pressure of the secondary portion 37 of the compressed working fluid 32 extracted through the extraction port 34 are dependent on an axial location of the extraction port 34 with respect to an axial centerline that extends through the compressor section 12. For example, a secondary portion 37 of the compressed working fluid 32 extracted from the compressor section 12 through an extraction port 34 that is positioned close to the combustion section 14 will be at a higher temperature and pressure than a secondary portion 37 of the compressed working fluid 32 that is extracted from the compressor section 12 through an extraction port 34 positioned further upstream from the combustion section 14.

As shown in FIG. 1, the combustion section 14 generally includes a plurality of combustors 38 arranged in an annular array around a compressor discharge casing 40 that at least partially surrounds a portion of the shaft 18. A compressor discharge plenum 42 is at least partially defined by the compressor discharge casing 40. A primary portion 43 of the compressed working fluid 32 flows from the compressor section 12 into the combustion. discharge plenum 42 where it is routed to cool various portions of the combustors 38. At least some of the primary portion 43 of the compressed working fluid 32 is mixed with a fuel within a combustion chamber 44 that is at least partially defined within each combustor 38 to produce a high temperature and high pressure combustion gas 46 Which flows into the turbine section 16.

The turbine section 16 generally includes an annular casing 48 that surrounds at least a portion of the shaft 18. The turbine section 16 further includes one or more stages or rows 50 of stationary nozzles 52 that extend radially inward from the casing 46. Adjacent stages 50 of the stationary nozzles 52 are axially separated by a stage or row 54 of turbine rotor blades 56 that extend radially outward from the shaft 18. The combustion gas 46 flows into the turbine section 16 from the combustors 38 of the combustion section 14. Each stage 50 of the stationary nozzles 50 focuses the combustion gas 46 onto a corresponding downstream stage 54 of the rotatable turbine blades 56, thereby causing the rotatable turbine blades 46 to rotate the shaft 18. As the combustion gas 46 flows through the turbine section 16, thermal energy is transferred to the stationary nozzles 52 and the rotatable turbine blades 56, thereby resulting in potentially life limiting high thermal stresses.

A cooling circuit 58 is at least partially defined between the casing 48 of the turbine section 16 and a corresponding stage 50 of the stationary nozzles 52. In particular gas turbine designs, a first cooling circuit 60 is at least partially defined at a second stage 62 of the stationary nozzles 52 and a second cooling circuit 64 is at least partially defined at a third stage 66 of the stationary nozzles 52. An inlet port 68 extends through the casing 48 of the turbine section 16 to at least partially define a flow path from outside of the casing 48 of the turbine section 16 into a respective one of the cooling circuit 58.

In existing gas turbine designs, as shown in FIG. 1, a flow path 70 is defined between the extraction port 34 of the compressor section 12 and the inlet port 68 of the turbine section 16. In this manner, the secondary portion 37 of the compressed working fluid 32 from the compressor section 12 may be routed through the extraction port 34, through the flow path 70, through the inlet port 68 and into the cooling circuit 58 of the turbine section 16 for cooling a corresponding stage 50 of the stationary nozzles 52 and/or other portions of the turbine section 16.

The flow path 70 is generally defined by one or more fluid conduits 72 such as pipes and/or one or more valves that fluidly join the pipes. In this configuration, the amount of the secondary portion 37 of the compressed working fluid 32 that flows between the compressor section 12 and the cooling circuit 58 of the turbine section 16 as the cooling medium is dependent on turbine speed and/or the load condition of the gas turbine. The flow rate of the secondary portion 37 of the compressed working fluid 32 that is routed to the cooling circuit 58 of the turbine section 16 as the compressed cooling medium is optimized for full speed-full load operating conditions of the gas turbine 10. However, when the gas turbine 10 is turned down to a part-load or part-speed operating condition, an excess of the secondary portion 37 of the compressed working fluid 32 flows to the cooling circuit 58 of the turbine section 16, thereby affecting the overall efficiency of the compressor section 12 and/or the gas turbine 10.

In certain gas turbine designs, as shown in FIG. 1, one or more actuator valves 74 are disposed along the flow path 72. The actuator valves 74 are connected to a controller 76 which communicates a command signal to the valves 74 in order to adjust the flow rate of the secondary portion 37 of the compressed cooling medium 32 between the compressor section and the cooling circuits 58 of the turbine section 16. However, various issues with this configuration include the initial cost associated with the actuator valves 74 and the controller 76 and the potential for failure of either one or both of the actuator valves 74 and the controller 76.

FIG. 2 illustrates a cross section side view of a portion of the gas turbine 10 shown in FIG. 1 including a system 100 for controlling the flow rate between the compressor section 12 and the cooling circuit(s) 58 of the turbine section 16 of the gas turbine 10, according to various embodiments of the present disclosure. As shown in FIG. 2, the system 100 generally includes a flow path 102 that extends between the compressor section 12 and the cooling circuit(s) 58 of the turbine section 16 of the gas turbine 10, and at least one thermally actuated variable area flow valve 104, herein referred to as "variable flow valve 104", that is disposed within the flow path 102 between the compressor section 12 and the cooling circuits 58 of the turbine section 16.

The flow path 102 may be at least partially defined by one or more fluid conduits 106 such as pipes, valves and/or flexible conduits that extend at least partially between the extraction port 34 of the compressor section 12 and the inlet port 68 of the turbine section 16. Each or some of the fluid conduits 106 include a flange 107 disposed at one end for joining the fluid conduit to the extraction port 34 of the compressor section 12, the inlet port 68 of the turbine section 16, to another fluid conduit 106 of the flow path 102 and/or to the variable flow valve 104. In various embodiments, the system 100 may include a plurality of flow paths 102 and a plurality of the variable flow valves 104. The flow paths may extend between the compressor section 12 and the cooling circuits 58 of the turbine section 16 and may be configured the same or substantially similar to the flow path 102 as described herein. In addition, each or some of the flow paths may include one or more of the variable flow valves placed within the flow path in series and/or in parallel.

FIG. 3 provides a perspective view of the flow valve 104 as shown in FIG. 2, according to various embodiments of the present invention and FIG. 4 provides a cross section perspective view of the variable flow valve 104 as shown in FIG. 3. As shown in FIG. 3, the variable flow valve 104 includes an annular main body 106 that circumferentially surrounds an annular inner sleeve 108. The main body 106 may be configured to connect to a corresponding flange 107 (FIG. 2), to the extraction port 34 (FIG. 2) of the compressor section 12, to the inlet port 68 (FIG. 2) of the turbine section 16 and/or the casing 20 of the compressor section 12 or the casing 48 of the turbine section 16. For example, the main body 106 may include a plurality of bolt passages 110 that extend generally axially through a radially outer portion 112 of the main body 106.

As shown in FIGS. 3 and 4, the inner sleeve 108 defines an annular flow path 114 that extends generally axially through the main body 106 with respect to an axial centerline of the main body 106. As shown in FIG. 4, the inner sleeve 108 has an upstream end 116 axially separated from a downstream end 118 with respect to the axial center line of the main body 106. The downstream end 118 of the inner sleeve 108 defines an opening 120 through the inner sleeve 108. The inner sleeve 108 may be joined to the main body 106 in any manner know in the art that is suitable to withstand the operating conditions within the flow path 102 of the system 100. For example, the inner sleeve 108 may be joined to the main body 106 by welding or brazing. In the alternative, the inner sleeve 108 may be cast with the main body 106 as a singular component.

In particular embodiments, the inner sleeve 108 comprises of a shape memory alloy. The inner sleeve 108 may be constructed from any shape memory alloy known in the art that is suitable for use within the flow path 102 of the system 100 in order to carry out the invention. A shape memory alloy can exist in two distinct temperature dependent crystal structures or phases. The temperature at which a phase change occurs between the crystal structures is dependent upon the composition of the alloy. This phase change temperature is known as the transition temperature. For example, one distinct crystal structure, known as martensite, corresponds to a lower temperature and a second distinct crystal structure, known as austenite, corresponds to a higher temperature.

Two-way shape memory alloy has the ability to recover a preset shape upon heating above the transformation temperature and to return to a certain alternate shape upon cooling below the transformation temperature. The two-way shape memory alloy may be programmed or trained through a process of mechanical working and heat treatment so that it responds to temperature changes and/or the transition temperature in a predictable and repeatable manner. In alternate embodiments, the inner sleeve 108 may comprise of a bi-metallic material which responds to the transformation temperature in a similar manner to the shape memory alloy. In other embodiments, the inner sleeve 108 may comprise of a high temperature shape memory polymer which responds to the transformation temperature in a similar manner to the shape memory alloy.

In particular embodiments, the inner sleeve 108 is constructed of a two-way shape memory alloy such as nickel titanium ("NiTi") alloy having a phase change or transition temperature within a heat transient of the compressed cooling medium 32 flowing between the compressor section 12 and the cooling circuits 58 of the turbine section 16. As shown in FIGS. 5 and 6, at least a portion of the inner sleeve 108 such as the downstream end 118 is subjected to a programming process in which the inner sleeve 108 has a first opening size 122 at the martensite or lower temperature configuration and as shown in FIGS. 7 and 8, a second opening size 124 at the austenite or higher temperature configuration.

As the gas turbine 10 transitions from a lower temperature operating condition, such as part-speed/part-load or during start-up, to a higher temperature operating condition, such as full-speed/full-load or peak load, the temperature of the secondary portion 37 of the compressed working fluid 32 being used as the cooling medium, the temperature within the turbine section 16 and the flow rate of the secondary portion 37 of the compressed working fluid 32 through the compressor section 12 will increase. As the secondary portion 37 of the compressed working fluid 32 is routed from the extraction port 34 into the flow path 102 and through the variable flow valve 104, the temperature of the inner sleeve 108 will increase, thereby causing the inner sleeve 108 to transition from its martensitic phase or configuration as shown in FIGS. 5 and 6 corresponding to the first opening size 122, to its austenitic phase or configuration as shown in FIGS. 7 and 8 corresponding to the second opening size 124. As a result, the inner sleeve 108 will transition from the first opening size 122 as shown in FIGS. 5 and 6, to the second opening size 124 as shown in FIGS. 7 and 8. In this manner, the flow rate of the secondary portion 37 of the compressed working fluid 32 that flows to the cooling circuit 58 of the turbine section 16 will increase, thereby optimizing the cooling of the turbine section 16 during the full-speed/part-load/full-load and/or peak load operating conditions.

As the gas turbine 10 transitions from the full-speed/full-load or peak load operating condition back to the part-speed/part-load operating condition, the temperature of the secondary portion 37 of the compressed working fluid 32 flowing through the flow path 102 and through the variable flow valve 104 as a cooling medium will decrease, thereby causing the inner sleeve 108 to transition from its austenitic phase or configuration as shown in FIGS. 7 and 8, to its martensitic phase or configuration as show in FIGS. 5 and 6. As a result, the opening 122 (FIG. 4) defined by the inner sleeve 108 will decrease from the second opening 124 (FIGS. 7 and 8) back to the first opening 122 (FIGS. 5 and 6). In this manner, the flow rate of the secondary portion 37 of the compressed working fluid 32 flowing to the cooling circuit 58 of the turbine section 16 as the compressed cooling medium will be restricted, thereby improving the performance of the compressor section 12 and/or the overall efficiency of the gas turbine 10 by utilizing the secondary portion 37 of the compressed working fluid 32 for cooling various other components of the gas turbine 10, thereby optimizing performance of the compressor section 12 and/or the gas turbine across multiple operating modes. For example, during part-load or turn down operation modes.

FIGS. 9 and 10 illustrate alternate embodiments of the variable flow valve 104. As shown, the main body 106 of the variable flow valve 104 may be inserted between two adjacent flanges 108. The two adjacent flanges 108 may be disposed on adjacent fluid conduits 106, a fluid conduit 106 and the extraction port 34 (FIG. 2) of the compressor section 12 and/or a fluid conduit 106 and the inlet port 68 of the turbine casing 16. The variable flow valve 104 may be deployed in any flow path that extends from the compressor section 12 to another portion of the gas turbine 10. For example, the variable flow valve 104 may be deployed in a flow path (not shown) that extends between the compressor section 12 and the combustion section 14 of the gas turbine 10 and/or to an auxiliary device (not shown) such as a heat exchanger.

In an additional embodiment, as shown in FIG. 11, the system 100 may utilize two of the variable flow valves 104 in parallel within the same flow path 102. The inner sleeve 108 of each of the variable flow valves 104 is trained to change its corresponding opening size 120 at different temperatures. In addition or in the alternative, the inner sleeve 108 of each variable flow valve 104 may comprise of a different type of shape memory alloy where the different shape memory alloys respond differently to temperature variations. A first valve 130 of the variable cooling flow valves 104 reduces the opening size 120 flow area with a reduction of temperature of the secondary portion 37 of the compressed working fluid 32, for example, when the turbine is operated in the part-load or the turn down operation modes, A second valve 132 of the variable flow valves 104 will maintain a constant opening size 120 when the temperature of the secondary portion 37 of the compressed working fluid 32 is above a predetermined value. Once the gas turbine operation load goes down and the temperature of the secondary portion 37 of the compressed working fluid 32 being used as the cooling medium decreases below a trigger temperature, the opening size 120 of the inner sleeve 108 will increase. As a result, more air will be bypassed and the turndown capability of the gas turbine 10 will be improved.

More specifically, in this embodiment, at lower load levels such as during turndown, the amount of fuel consumed by the combustors is decreased and the amount of the primary portion of the compressed working fluid provided for combustion also changes to maintain emissions compliance, specifically to stay within $NO_x$ and CO emissions compliance limits. As ambient temperature falls, the temperature of the compressed working fluid 32 decreases, thus having an adverse effect on the emissions produced. In addition, the minimum load required to meet CO compliance rises steeply. This relationship is represented graphically in FIG. 12. The emissions can be improved by modulating the compressed working fluid 32 that is available for combustion by bypassing more of the compressed working fluid 32 as a cooling medium through the flow path 102. At high compressed working fluid 32 temperatures, which occur at high ambient temperatures, the flow opening size 120 of the inner sleeve 108 will be minimal. At low compressed working fluid 32 temperatures, which occur at low ambient temperatures and low loads, the opening size 120 of the inner sleeve 108 reacts to a low temperature set point, by providing an enlarged opening size 120. This will result in a reduction of air flow to the combustor 38 and an increase in the flow rate of the secondary portion 37 of the compressed working fluid 32. As a result, lower carbon monoxide (CO) levels will be realized during turndown operation of the gas turbine when ambient temperatures are lower than a design reference or trigger temperature, in addition, the system 100 provides improved control of the compressor bleed air during start-up of the gas turbine 10 based on the ambient air temperature to avoid compressor surge and to control emission levels.

The system as shown in FIGS. 2 through 10 and as described herein, provides various technical advantages over current systems used to control the cooling flow of the from the compressor section of a the gas turbine. For example, controlling cooling flow between the compressor section and the turbine section using the variable flow valve having the inner sleeve comprising a shape memory alloy reduces costs and increases reliably by reducing hardware and electrical connectivity issues.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A system for controlling a flow rate of a compressed cooling medium between a compressor section and a turbine section of a gas turbine engine, the system comprising:
   a. a flow path defined between the compressor section and the turbine section of the gas turbine engine; and
   b. a thermally actuated variable flow valve in said flow path, said variable flow valve including an inner sleeve surrounded by an annular main body from an upstream end of the inner sleeve to a downstream end of the inner sleeve, the annular main body of the variable flow valve inserted between two adjacent flanges within said flow path, wherein said downstream end of the inner sleeve is configured to change in shape in response to temperature changes, and wherein said downstream end defines an opening that changes in size based on a temperature of the compressed cooling medium flowing therethrough.

2. The system as in claim 1, wherein said inner sleeve is annular and is circumferentially surrounded by said annular main body, said inner sleeve extending at least partially through said main body.

3. The system as in claim 2, wherein said inner sleeve of said variable flow valve defines said opening of said variable flow valve.

4. The system as in claim 2, wherein said inner sleeve of said variable flow valve comprises at least one of a shaped memory alloy, a shaped memory polymer or a bi-metallic material.

5. The system as in claim 2, where said inner sleeve of said variable flow valve defines an annular flow path through said annular main body of said variable flow valve for routing the compressed cooling medium therethrough.

6. The system as in claim 2, wherein said inner sleeve comprises a shaped memory alloy having a martensite configuration and an austenite configuration.

7. The system as in claim 6, wherein said martensite configuration of said inner sleeve corresponds to a first opening size and said austenite configuration corresponds to a second opening size.

8. The system as in claim 7, wherein said first opening size is smaller than said second opening size.

9. The system as in claim 1, wherein said flow path is configured to route the cooling medium from the compressor section outside of the gas turbine engine and into the turbine section of the gas turbine engine.

10. A system for controlling a flow rate of a compressed cooling medium between a compressor section and a turbine section of a gas turbine engine, the system comprising:
    a. an extraction port of the compressor section;
    b. an inlet port of the turbine section;
    c. a flow path defined between said extraction port and said inlet port for routing the compressed cooling medium between the compressor section and the turbine section; and
    d. a thermally actuated variable flow valve in said flow path between said extraction port and said inlet port, said variable flow valve having an annular main body, the main body of the variable flow valve inserted between two adjacent flanges within said flow path, wherein said variable flow valve defines an opening that changes in size based on a temperature of the cooling medium flowing therethrough, and wherein said variable flow valve further comprises an annular inner sleeve circumferentially surrounded by said annular main body, said inner sleeve extending at least partially through said main body.

11. The system as in claim 10, wherein said inner sleeve of said variable flow valve defines said opening of said variable flow valve.

12. The system as in claim 10, wherein said inner sleeve of said variable flow valve comprises of at least one of a shaped memory alloy, a shaped memory polymer or a bi-metallic material.

13. The system as in claim 10, where said inner sleeve of said variable flow valve defines an annular flow path through the annular main body of said variable flow valve for routing the compressed cooling medium therethrough.

14. The system as in claim 10, wherein the turbine section further includes a cooling circuit defined within the turbine section, said cooling circuit being in fluid communication with said flow path.

15. The system as in claim 14, further comprising a fluid conduit, said fluid conduit at least partially defining said flow path between said extraction port of the compressor and said inlet port of the turbine section, wherein said variable flow valve is coupled to one end of said fluid conduit to control the flow of the compressed cooling medium therethrough.

16. A gas turbine engine comprising:
    a. a compressor section having a casing and an extraction port that extends through the casing, said extraction port defining a flow path for routing a compressed cooling medium through the casing;
    b. a combustion section downstream from the compressor section;
    c. a turbine section downstream from the combustion section, the turbine section having a turbine casing and an inlet port, the turbine casing at least partially defining a cooling circuit within the turbine section, said inlet port defining a flow path through the turbine casing and into said cooling circuit;
    d. a flow path defined between said extraction port of the compressor section and said inlet port of the turbine easing;
    e. a first thermally actuated variable flow valve disposed within said flow path between said extraction port and said inlet port, said first variable flow valve defining an opening that changes in size based on a temperature of the compressed cooling medium flowing therethrough; and f. a second thermally actuated variable flow valve disposed within said flow path between said extraction port and said inlet port, said second variable flow valve defining an opening that changes in size based on a temperature of the compressed cooling medium flowing therethrough;

wherein said first and second variable flow valves are arranged in parallel within said flow path, and wherein the first and second variable flow valves are trained such that the first variable flow valve opens at a first temperature and the second variable flow valve opens at a second temperature, the first temperature different from the second temperature.

17. The gas turbine engine as in claim 16, wherein the first variable flow valve is configured such that the opening of the first variable flow valve is reduced with a reduction of the temperature of the compressed cooling medium flowing therethrough.

18. The gas turbine engine as in claim 16, wherein the second variable flow valve is configured such that the second variable flow valve maintains a constant opening size when the temperature of the compressed cooling medium flowing therethrough is above a predetermined value.

19. The gas turbine engine as in claim 18, wherein the second variable flow valve is configured such that the opening size of the second variable flow valve increases when the temperature of the compressed cooling medium flowing therethrough decreases below a trigger temperature.

\* \* \* \* \*